Sept. 9, 1947.   W. FERRIS   2,427,325
ROTOR FOR HYDRODYNAMIC MACHINES
Filed Aug. 7, 1944

INVENTOR
WALTER FERRIS
BY Wesley P. Merrill
ATTORNEY

Patented Sept. 9, 1947

2,427,325

UNITED STATES PATENT OFFICE 2,427,325

ROTOR FOR HYDRODYNAMIC MACHINES

Walter Ferris, Milwaukee, Wis., assignor to The Oilgear Company, Milwaukee, Wis., a corporation of Wisconsin Application August 7, 1944, Serial No. 548,360

12 Claims. (Cl. 103—161)

This invention relates to rotors for hydrodynamic machines of the rolling piston type such as shown in Patent No. 2,074,068.

A machine of this type will function as a pump when it is driven mechanically and it will function as a motor when it is supplied with motive liquid. For the sake of simplicity, the machine will be referred to herein as a pump but it is to be understood that same machine will function as a motor and that the present invention is equally applicable to either a pump or a motor.

A pump of the rolling piston type has a rotary cylinder barrel provided with radial cylinders and pistons and arranged within an annular thrust member which rotates upon an axis offset from the cylinder barrel axis when the pump is pumping liquid. The pistons may extend radially outward at right angles to the cylinder barrel axis and have the outer ends thereof beveled and in contact with an annular reaction surface which is arranged upon the inside of the thrust member and inclined to the cylinder barrel axis, as shown in the above patent, or the pistons may be inclined to the cylinder barrel axis and have the outer ends thereof beveled and in contact with an annular reaction surface which is parallel to the axis of the thrust member as shown in Patent No. 2,105,454. In either case the reaction surface engages each piston upon a single spot which is offset far enough from the piston axis to cause the piston to rotate in opposite directions alternately as it reciprocates.

Due to the reaction surface engaging each piston upon a single spot, the pumping force transmitted through the piston is limited by the bearing value of that spot. If the pump is designed to create pressures below a moderate value such as 1200 lbs. per sq. in., each piston may be headless and of such diameter that the contact spot may be located far enough from the piston axis to cause the piston to rotate as it reciprocates. If the pump is designed to create pressures up to a high value such as 3500 p. s. i., the pistons must be reduced in diameter accordingly in order to keep the maximum pumping force within the bearing value of the contact spot and each piston must be provided with an enlarged head, as shown in Patent No. 2,074,068, in order that the contact spot may be located far enough from the piston axis to cause the piston to rotate as it reciprocates.

Rolling pistons with large heads operate successfully in pumps designed to create pressures up to the maximum ordinarily required but in a pump designed to create very high pressures, such as pressures of 5000 p. s. i., each piston would necessarily be so small in diameter that the distance between its axis and the contact spot would be so great relative to the radius of the piston that there would be grave danger of the head breaking off when the pump was required to create a very high pressure.

The present invention has as an object to provide a rolling piston pump with a rotor which will enable it to create very high pressures without danger of breaking the pistons.

According to the invention, pumping forces are transmitted from a reaction surface to a pumping piston through a hollow cylindrical pusher or non-pumping piston which is fitted in a recess formed in the cylinder barrel around the cylinder and which prevents transverse forces from being transmitted to the pumping piston.

The invention is exemplified by the rotor shown somewhat diagrammatically in the accompanying drawings in which the views are as follows.

Figure 1:
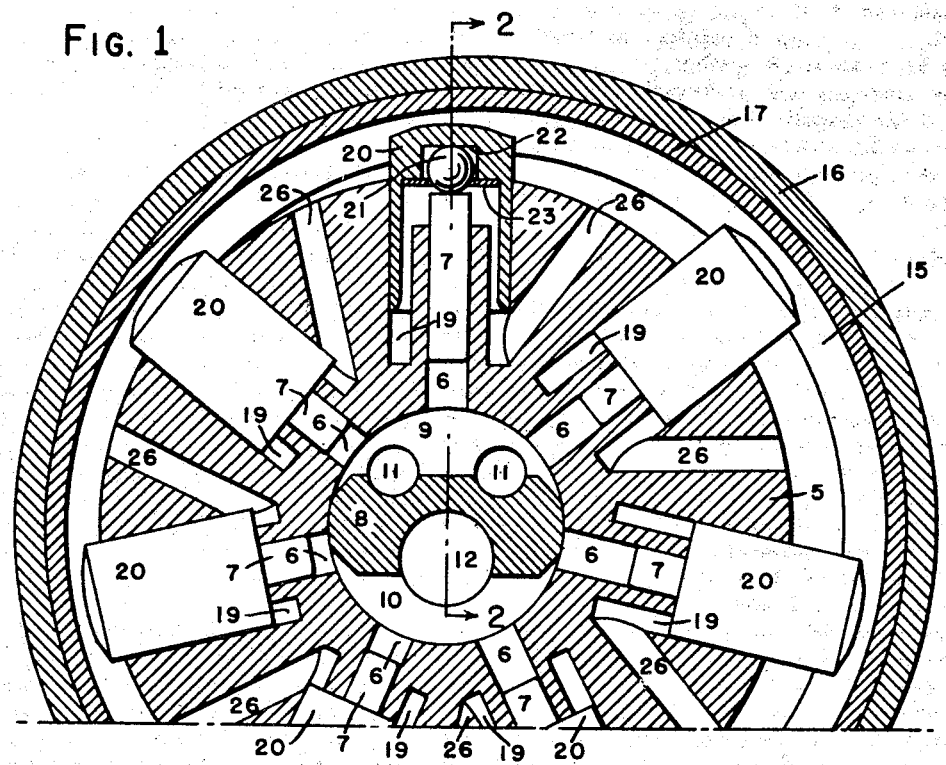
Fig. 1 is a partial transverse section through a rotor in which the invention is embodied, the view being taken on a line 1—1 of Fig. 2.
Figure 2:
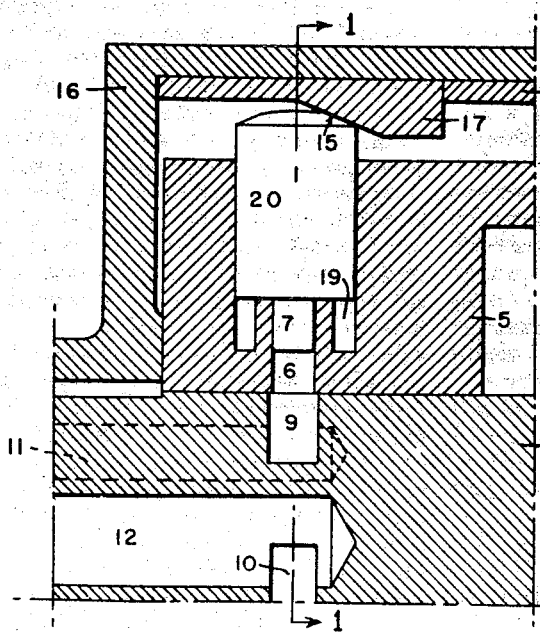
Fig. 2 is a partial longitudinal section through the rotor, taken on a line 2—2 of Fig. 1.

The rotor chosen for illustration includes a rotary cylinder barrel 5 having a plurality of radial cylinders 6 formed therein and a piston 7 fitted in each cylinder. For the purpose of illustration, cylinder barrel 5 is shown journaled upon a valve shaft or pintle 8 of the type employed in unidirectional pumps but it may be journaled upon any other type of pintle or it may be provided with internal passages and connected to an external circuit through a flat valve arranged upon the end of the cylinder barrel. As shown, pintle 8 has formed therein two diametrically opposed ports 9 and 10 with which each cylinder registers alternately as cylinder barrel rotates, two passages 11 which communicate with port 9 and extend axially through the pintle for connection to the high pressure side of an external circuit, and a large passage 12 which communicates with port 10 and extends axially through the pintle for connection to the low pressure side of the external circuit.

Each piston 7 is moved outward by centrifugal force or by low pressure liquid supplied to the inner end of its cylinder 6 during one half of each revolution of cylinder barrel 5 and it is moved inward during the other half of each revolution of cylinder barrel 5 by motion transmitted thereto from an annular reaction surface 15 which extends around cylinder barrel 5 and is inclined to the cylinder barrel axis. Reaction surface 15 is arranged upon the inside of a cylindrical thrust member 16 which is journaled in suitable bearings (not shown) and is eccentric to cylinder barrel 5 when the pump is pumping liquid. As shown, reaction surface 15 is formed upon a thrust ring 17 which is fitted within thrust member 16 and retained in position by a retainer ring 18.

In the pump shown in Patent No. 2,074,068, each piston is provided with an enlarged head and the reaction surface makes contact with each piston head upon a single spot which is offset from the piston axis so that the piston is caused to rotate as it reciprocates and the pumping force transmitted from the reaction surface to the piston head is resolved into a radial component which moves the piston inward and a transverse component which presses the piston against the side of the cylinder. That pump is very successful and in extensive commercial use but it is not suitable for creating pressures above a given range.

If the pump shown in Patent No. 2,074,068 were employed to create very high pressures, each of its pistons would necessarily be quite small in diameter in order that the pumping force would not exceed the bearing value of the contact spot through which the pumping force is transmitted from the reaction surface to the piston and, since the contact spot must be far enough from the piston axis to cause the piston to rotate, the difference between the radius of the piston and the distance between the piston axis and the contact spot would be so great that the pumping force would tend to break the heads off the pistons. If the end of the small diameter piston engaged the reaction surface, the contact spot would be so close to the piston axis that the piston would not rotate but would slide upon the reaction surface during rotation of the cylinder barrel and would cause abrasion of the reaction surface and/or the end of the piston.

In order that a pump of the rolling piston type may create very high pressures, the present invention provides means for transmitting the pumping forces to the pistons without subjecting the pumping pistons to any transverse forces. As shown, cylinder barrel 5 has an annular recess 19 formed therein around and concentric with each cylinder 6 and a hollow cylindrical pusher or non-pumping piston 20 is fitted in each recess 19 and has its outer end beveled and in contact with reaction surface 15.

The arrangement is such that reaction surface 15 engages each pusher 20 upon a single spot which is offset far enough from the pusher axis to cause each pusher to rotate as it reciprocates and the lateral components of the pumping forces land upon the walls of recesses 19 so that no transverse forces are transmitted to pistons 7.

The pumping forces may be transmitted by pushers 20 directly to pistons 7, as by having the outer ends of pistons 7 engage the inner faces of the outer ends of pushers 20, but means are preferably provided to compensate for variations in the relative positions of the pistons and the pushers due to slight manufacturing errors and/or to wear.

As shown in Fig. 1, the pumping force is transmitted from a pusher 20 to a piston 7 through a hardened steel ball 21 which is arranged between the outer end of piston 7 and a face 22 formed upon the inside of the outer end wall of pusher 20. Face 22 has been shown as being flat but it is preferably slightly spherical with a radius thereof coincident with the axis of piston 7 so that ball 21 will be centered upon the axis of piston 7 by centrifugal force when the pump is started and before piston 7 is subjected to pressure. To facilitate assembly of the parts, a spring washer 23 may be pressed into the bore of pusher 20 to hold ball 21 in position during assembly.

Ball 21 permits piston 7 to slide freely in cylinder 6 and pusher 20 to slide freely in recess 19 regardless of small errors in the alignment and the concentricity of cylinder 6 and recess 19. When a high pumping force is transmitted through the piston and pusher assembly, ball 21 will sink into the end of piston 7 and into face 22 until it has established sufficient bearing area to transmit the pumping force, the depressions or dimples formed by ball 21 in piston 7 and in face 22 being very shallow. If wear should occur and cause a change in the relative positions of piston 7 and pusher 20, ball 21 will roll along the surfaces in contact therewith and form new depressions or extensions of the old depressions in those surfaces.

Figure 3:
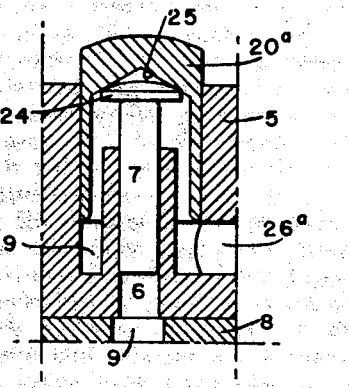
Fig. 3 is a detail view of a modification.

Instead of using a hardened steel ball as shown in Fig. 1, the pumping force may be transmitted from the pusher to the piston through a thrust washer 24 as shown in Fig. 3. Washer 24 has a spherical upper face to engage a conical surface 25 formed in the end wall of a pusher 20ª which is otherwise the same as pusher 20. The lower face of washer 24 may be approximately flat as shown or it may be spherical like the upper surface. If both of its faces are spherical, washer 24 will compensate for variations in both the alignment and the concentricity of the piston and the pusher but it will not form depressions in the contacting surfaces as its curvature is great enough to provide sufficient bearing area. If its lower face is flat, washer 24 will compensate for errors in concentricity but it will be of little value in compensating for errors in alignment.

The motive liquid used in power pumps is ordinarily oil which also lubricates the moving parts. A small quantity of this oil leaks past the pistons due primarily to a film of oil adhering to each piston 7 as it moves outward and a part of the film being scraped off by end of the cylinder as the piston moves inward, thereby causing oil to accumulate within pusher 20 so that it is necessary to provide means for the escape of the leakage oil. If a drain hole were provided in the outer end of the pusher, the leakage oil would be thrown out of the pusher by centrifugal force almost as fast as it leaked past the piston and the pusher would be unlubricated or insufficiently lubricated.

An important feature of the present invention is the utilization of this leakage oil for lubricating the pushers. To this end, the inner peripheral wall of pusher 20 is spaced from the outer periphery of cylinder 6 and the leakage oil is permitted to escape through a drain passage 26 which extends from the inner end of each recess 19 through the periphery of rotor 5, as shown in Fig. 1, or through a drain passage 26ª which extends from each recess 19 through the end of rotor 5 as indicated in Fig. 3.

The arrangement is such that the liquid leaking past a piston must flow through the space between cylinder 6 and pusher 20 into contact with the outer wall of the recess 19 before it can escape so that the outer wall of recess 19 and the outer peripheral surface of pusher 20 are adequately lubricated.

The invention herein set forth is susceptible of various modifications and adaptations without departing from the scope of the invention which is hereby claimed as follows:

1. In a hydrodynamic machine having a cylindrical thrust member, the combination of a rotary cylinder barrel arranged within said member and provided with a cylinder which opens to the periphery thereof, the axes of said thrust member and said cylinder barrel being offset from each other when the machine is performing useful work, an annular reaction surface arranged upon the inside of said thrust member and inclined to the axis of said cylinder, a piston fitted in said cylinder, a pusher engaging said reaction surface for transmitting radial forces to and from said piston, said surface engaging said pusher at a point offset far enough from the piston axis to provide a rolling contact therebetween, and means for guiding said pusher to enable it to prevent the transmission to said piston of forces transverse thereto.

2. In a hydrodynamic machine having a cylindrical thrust member, the combination of a rotary cylinder barrel arranged within said member and provided with a cylinder which opens to the periphery thereof, the axes of said thrust member and said cylinder barrel being offset from each other when the machine is performing useful work, an annular reaction surface arranged upon the inside of said thrust member and inclined to the axis of said cylinder, a pumping piston fitted in said cylinder, and a non-pumping hollow piston fitted in said cylinder barrel and engaging said reaction surface to transmit radial forces to and from said piston, said non-pumping piston being engaged by said surface at a point offset far enough from the piston axis to provide a rolling contact therebetween and being guided by said cylinder barrel to prevent lateral components of said forces from being transmitted to said piston.

3. In a hydrodynamic machine having a cylindrical thrust member, the combination of a rotary cylinder barrel arranged within said member and provided with a cylinder which opens to the periphery thereof, the axes of said thrust member and said cylinder barrel being offset from each other when the machine is performing useful work, an annular reaction surface arranged upon the inside of said thrust member and inclined to the axis of said cylinder, a pumping piston fitted in said cylinder, a non-pumping hollow piston fitted in said cylinder barrel and engaging said reaction surface to transmit radial forces to and from said piston, said non-pumping piston being engaged by said surface at a point offset far enough from the piston axis to provide a rolling contact therebetween and being guided by said cylinder barrel to prevent lateral components of said forces from being transmitted to said piston, and means arranged between the outer end of said pumping piston and the inner face of the head of said non-pumping piston to compensate for variations in the concentricity of said pumping and non-pumping pistons.

4. In a hydrodynamic machine having a cylindrical thrust member, the combination of a rotary cylinder barrel arranged within said member and provided with a cylinder which opens to the periphery thereof, the axes of said thrust member and said cylinder barrel being offset from each other when the machine is performing useful work, an annular reaction surface arranged upon the inside of said thrust member and inclined to the axis of said cylinder, a pumping piston fitted in said cylinder, a non-pumping hollow piston fitted in said cylinder barrel and engaging said reaction surface to transmit radial forces to and from said piston, said non-pumping piston being engaged by said surface at a point offset far enough from the piston axis to provide a rolling contact therebetween and being guided by said cylinder barrel to prevent lateral components of said forces from being transmitted to said piston, and means arranged between the outer end of said pumping piston and the inner face of the head of said non-pumping piston to compensate for variations in the concentricity and alinement of said pumping and non-pumping pistons.

5. In a hydrodynamic machine having a cylindrical thrust member, the combination of a rotary cylinder barrel arranged within said member and provided with a cylinder which opens to the periphery thereof, the axes of said thrust member and said cylinder barrel being offset from each other when the machine is performing useful work, an annular reaction surface arranged upon the inside of said thrust member and inclined to the axis of said cylinder, a pumping piston fitted in said cylinder, a non-pumping hollow piston fitted in said cylinder barrel and engaging said reaction surface to transmit radial forces to and from said piston, said non-pumping piston being engaged by said surface at a point offset far enough from the piston axis to provide a rolling contact therebetween and being guided by said cylinder barrel to prevent lateral components of said forces from being transmitted to said piston, a conical face formed in the inner wall of the head of said non-pumping piston, and a thrust member having a spherical surface in engagement with said conical face and an approximately flat surface in engagement with the outer end of said pumping piston to compensate for small variations in the concentricity of said pumping and non-pumping pistons.

6. In a hydrodynamic machine having a cylindrical thrust member, the combination of a rotary cylinder barrel arranged within said member and provided with a cylinder which opens to the periphery thereof, the axes of said thrust member and said cylinder barrel being offset from each other when the machine is performing useful work, an annular reaction surface arranged upon the inside of said thrust member and inclined to the axis of said cylinder, a pumping piston fitted in said cylinder and having a substantially flat face upon its outer end, a non-pumping hollow piston fitted in said cylinder barrel and engaging said reaction surface to transmit radial forces to and from said piston, said non-pumping piston being engaged by said surface at a point offset far enough from the piston axis to provide a rolling contact therebetween and being guided by said cylinder barrel to prevent lateral components of said forces from being transmitted to said piston, an approximately flat face formed upon the inner wall of the head of said non-pumping piston, and a ball arranged between the faces on said pistons to transmit forces therebetween and to compensate for small variations in the concentricity and alinement of said pistons.

7. In a hydrodynamic machine having a cylindrical thrust member, the combination of a rotary cylinder barrel arranged within said member and provided with a cylinder which opens to the periphery thereof and with a recess which extends around said cylinder, the axes of said thrust member and said cylinder barrel being offset from each other when the machine is performing useful work, an annular reaction surface arranged upon the inside of said thrust member and inclined to the axis of said cylinder, a piston fitted in said cylinder, and a hollow pusher fitted in said recess with its inner wall spaced from said cylinder and its head in contact with said reaction surface to transmit radial forces to and from said piston and to prevent the transmission of transverse forces to said piston, said cylinder barrel having a passage leading from the inner part of said recess to the outside of said cylinder barrel to permit the escape of liquid leaking past said piston and to cause said leakage liquid to lubricate said pusher.

8. In a hydrodynamic machine having a cylindrical thrust member, the combination of a rotary cylinder barrel arranged within said member and provided with a cylinder which opens to the periphery thereof and with a recess which extends around said cylinder, the axes of said thrust member and said cylinder barrel being offset from each other when the machine is performing useful work, an annular reaction surface arranged upon the inside of said thrust member and inclined to the axis of said cylinder, a piston fitted in said cylinder, a hollow pusher fitted in said recess with its inner wall spaced from said cylinder and its head in contact with said reaction surface to transmit radial forces to and from said piston and to prevent the transmission of transverse forces to said piston, said cylinder barrel having a passage leading from the inner part of said recess to the outside of said cylinder barrel to permit the escape of liquid leaking past said piston and to cause said leakage liquid to lubricate said pusher, and means arranged between the outer end of said piston and the inner face of the head of said pusher to compensate for variations in the concentricity of said piston and said pusher.

9. In a hydrodynamic machine having a cylindrical thrust member, the combination of a rotary cylinder barrel arranged within said member and provided with a cylinder which opens to the periphery thereof and with a recess which extends around said cylinder, the axes of said thrust member and said cylinder barrel being offset from each other when the machine is performing useful work, an annular reaction surface arranged upon the inside of said thrust member and inclined to the axis of said cylinder, a piston fitted in said cylinder, a hollow pusher fitted in said recess with its inner wall spaced from said cylinder and its head in contact with said reaction surface to transmit radial forces to and from said piston and to prevent the transmission of transverse forces to said piston, said cylinder barrel having a passage leading from the inner part of said recess to the outside of said cylinder barrel to permit the escape of liquid leaking past said piston and to cause said leakage liquid to lubricate said pusher, and a thrust member arranged between the outer end face of said piston and the inner face of the head of said pusher to transmit forces therebetween and provided with a spherical surface in engagement with at least one of said faces to compensate for variations in the relative positions of said piston and pusher.

10. A pump rotor comprising a rotatable cylinder barrel having a plurality of cylinders which open to the periphery thereof and which have the outer ends thereof arranged in at least one circular row, a piston fitted in each cylinder, a pusher for forcing each piston inward, a cylindrical thrust member encircling said cylinder barrel eccentric thereto, an annular reaction surface arranged upon the inside of said thrust member to engage the outer ends of said pushers and effect reciprocation of said pushers and said pistons during rotation of said cylinder barrel, said reaction surface being inclined to the axes of said pushers and said pistons and engaging each pusher upon a spot offset far enough from the pusher axis to provide a rolling contact therebetween, and means for guiding each pusher to enable it to prevent transmission to the piston associated therewith of forces transverse thereto.

11. A pump rotor comprising a rotatable cylinder barrel having a plurality of cylinders which open to the periphery thereof and which have the outer ends thereof arranged in at least one circular row, a piston fitted in each cylinder, a hollow cylindrical pusher fitted in said cylinder barrel around each piston for forcing that piston inward, a cylindrical thrust member encircling said cylinder barrel eccentric thereto, and an annular reaction surface arranged upon the inside of said thrust member to engage the outer ends of said pushers and effect reciprocation of said pushers and said pistons during rotation of said cylinder barrel, said reaction surface being inclined to the axes of said pushers and said pistons and engaging each pusher upon a spot offset far enough from the pusher axis to provide a rolling contact therebetween and said pushers being guided by said cylinder barrel to enable them to prevent transmission to said pistons of forces transverse thereto.

12. In a hydrodynamic machine having a cylindrical thrust member, the combination of a rotary cylinder barrel arranged within said member eccentric thereto and provided with a plurality of cylinders which open to the periphery thereof and which have the outer ends thereof arranged in at least one circular row, an annular reaction surface arranged upon the inside of said thrust member and inclined to the axes of said cylinders, a pumping piston fitted in each cylinder, a plurality of hollow non-pumping pistons each of which is fitted in said cylinder barrel around a pumping piston and engaging said reaction surface to transmit radial forces to and from that piston, each non-pumping piston being engaged by said surface upon a spot offset far enough from the piston axis to provide a rolling contact therebetween and being guided by said cylinder barrel to prevent lateral components of said forces from being transmitted to the pumping piston associated therewith, and means arranged between the outer ends of said pumping pistons and the inner faces of the heads of said non-pumping pistons to compensate for variations in the concentricity of said pumping and non-pumping pistons.

WALTER FERRIS.

REFERENCES CITED

The following references are of record in the file of this patent:

UNITED STATES PATENTS

| Number | Name | Date |
|---|---|---|
| 2,035,647 | Ferris | Mar. 31, 1936 |
| 2,254,103 | Douglas | Aug. 26, 1941 |
| 2,293,692 | Wylie | Aug. 18, 1942 |